United States Patent [19]

Considine et al.

[11] 4,106,851

[45] Aug. 15, 1978

[54] FILM EXAMINING WITH DIFFUSE AND SPECULAR ILLUMINATION

[75] Inventors: Philip S. Considine, Woburn; Robert E. Whitney, Burlington, both of Mass.

[73] Assignee: Eikonix Corporation, Burlington, Mass.

[21] Appl. No.: 725,396

[22] Filed: Sep. 22, 1976

[51] Int. Cl.² .................................................. G02B 21/06
[52] U.S. Cl. .................................... 350/87; 362/234
[58] Field of Search .................................... 350/87–91, 350/235–238, 141, 283, 81, 188, 321; 240/2 MA, 2 M; 355/67; 40/63 A, 64 A; 362/234, 233

[56] References Cited

U.S. PATENT DOCUMENTS

| 2,971,080 | 2/1961 | Boughton | 350/87 |
| 3,244,062 | 4/1966 | Sweet | 350/87 |

FOREIGN PATENT DOCUMENTS

| 950,631 | 2/1964 | United Kingdom | 240/2 MA |
| 1,364,251 | 8/1974 | United Kingdom | 350/87 |

*Primary Examiner*—Jon W. Henry
*Attorney, Agent, or Firm*—Charles Hieken

[57] ABSTRACT

A compact stereo light table includes a pair of high intensity spot sources on a diffusely illuminated background that are selectively diffuse or specular. There are controls for spot brightness, diameter and positioning and specular to diffuse adjustment.

10 Claims, 4 Drawing Figures

FILM EXAMINING WITH DIFFUSE AND SPECULAR ILLUMINATION

BACKGROUND OF THE INVENTION

The present invention relates in general to film viewing and more particularly concerns novel apparatus and techniques for providing photo interpreters with the means to view imagery using diffuse and specular illumination in a relatively compact structure that facilitates selection of conventional diffuse illumination or specular illumination for image enhancement.

Typically photo interpreters view films on a light table having diffuse illumination. However, specular illumination provides image enhancement. One prior art approach for providing specular illumination of spots on a diffuse background used a specular source above a diffuse source with both being below clear glass. This arrangement is characterized by a number of disadvantages. The structure is bulky, and it is difficult to view a transparency spaced from the diffuser plate.

Accordingly, it is an important object of this invention to provide an improved stereo light table providing photo interpreters with the means to view imagery using diffuse and specular illumination.

It is a further object of the invention to achieve the preceding object while eliminating one or more of the disadvantages noted above.

It is a further object of the invention to achieve one or more of the preceding objects with a compact arrangement that provides a convenient means for controlling the illumination.

It is another object of the invention to achieve one or more of the preceding objects while controlling brightness of the specular source independently of color temperature.

It is a further object of the invention to achieve one or more of the preceding objects while controlling the range of illumination type at spots on the light table between specular and diffuse.

It is a further object of the invention to achieve one or more of the preceding objects with a compact light table arranged for viewing stereo images.

SUMMARY OF THE INVENTION

According to the invention, there is a light table having a diffusion plate formed with at least one clear aperture, means for backlighting the diffusion plate to provide a diffuse background and means for illuminating the aperture from below with a specular light source. According to another aspect of the invention there is means for removably supporting the diffusion plate and means for selectively positioning the spectral light source beneath the diffusion plate. Preferably the light table includes a stereoscopic viewer with means for selectively positioning the viewer above the table. A feature of the invention resides in means for controlling the brightness and degree of specularity of the specular light source.

Numerous other features, objects and advantages of the invention will become apparent from the following specification when read in connection with the accompanying drawing in which:

DETAILED DESCRIPTION OF PREFERRED EMBODIMENTS

Figure 1:
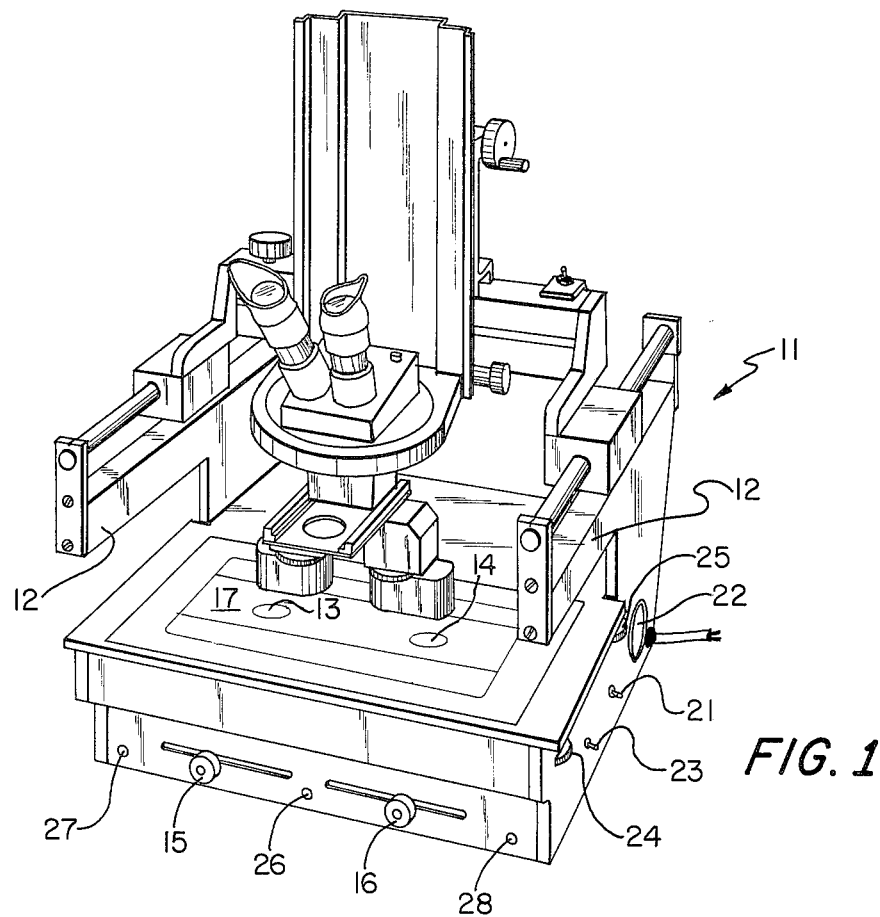
FIG. 1 is a perspective view of an embodiment of the invention.

With reference now to the drawing and more particularly FIG. 1 thereof, there is shown a perspective view of an embodiment of the invention. The light table includes a standard stereo microscope bridge mount 11 for providing accurate focusing adjustment with limited scanning for commercially available microscopes such as the Bausch and Lomb Stereo Zoom 240 and Wild M5 miroscopes. The bridge assembly is typically the commerically available Richards MIMS bridge assembly with lateral and front to rear adjustment mounted on the cantilevered support members 12 providing side clearance for the user. The light table includes a removable diffusion plate formed with left and right apertures 13 and 14, respectively, for transmitting light from respective specular light sources positioned by left and right positioning knobs 15 and 16, respectively, for interfacing with the various microscope rhomboids immediately above so that a diffusion plate may be changed with apertures 13 and 14 separated to match spacing of the microscope rhomboids. A clear glass plate 17 covers the diffusion plate.

The right side panel includes a power switch 21 for controlling power to the unit used for illumination and operation of the fan that exhausts through fan exhaust port 22. The right side panel also includes a spot source switch 23 that is a three-position switch for selecting off, high intensity or low intensity. Thumb wheels 24 and 25 control spot diameter and brightness, respectively, for the right light source, and there are a similar pair of controls on the left panel not visible in FIG. 1. The left panel also includes a spot source switch like switch 23 for the left source and a switch for controlling power to the diffuse light source. Pilot light 26 is illuminated when power to the light table is on. The left lamp indicator 27 and right lamp indicator 28 are on when left and right light sources are on, respectively.

Figure 2:
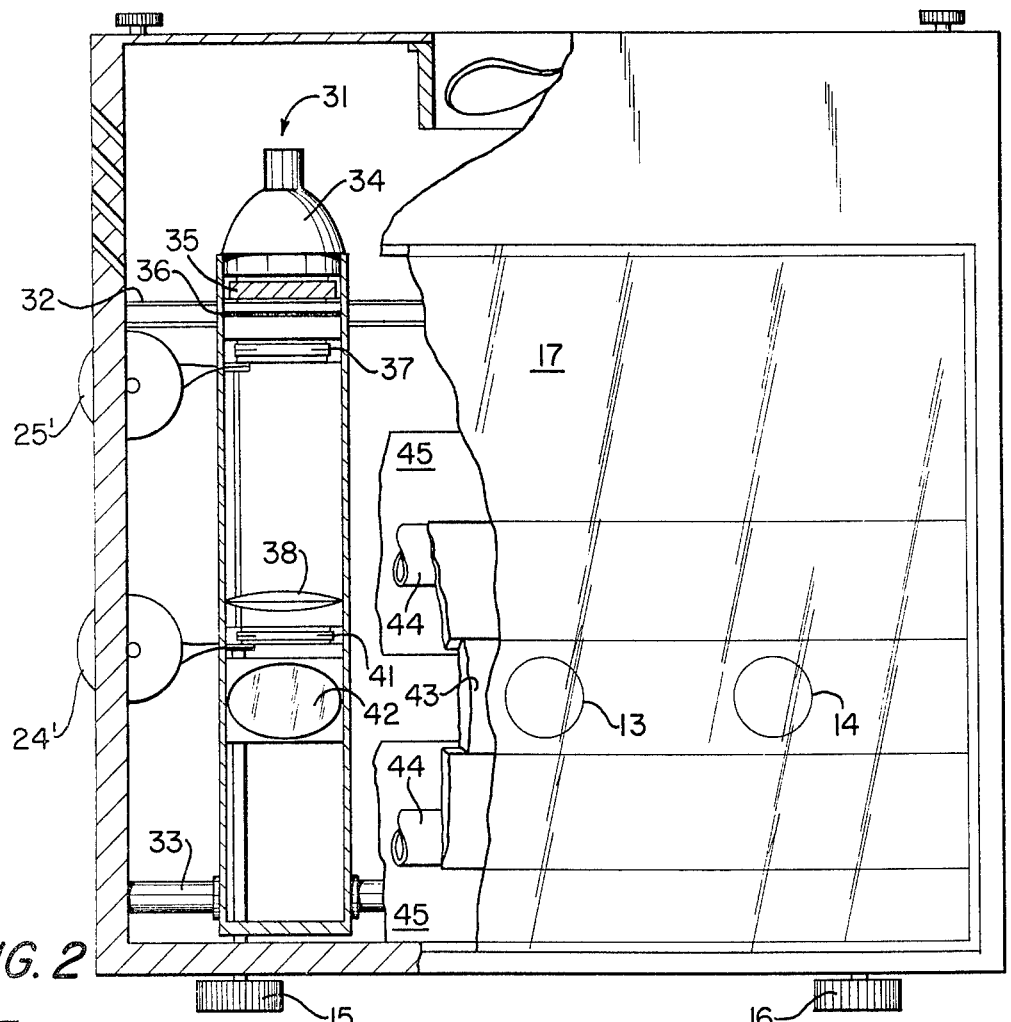
FIG. 2 is a cutaway drawing of the top surface of the light table showing the optical configuration of the high intensity, collimated or diffuse illuminator.

Referring to FIG. 2, there is shown a top view of the light table with portions cut away to better illustrate the optical configuration of the high intensity, collimated or diffuse illuminator. The same reference symbols identify corresponding elements throughout the drawing. Left light source 31 is exposed and, like the right source, rides on rear rod 32 and front rod 33. The high intensity light source may comprise a standard General Electric EKS, 250 watt, 24 volt projector lamp 34 that is an efficient tungsten halogen lamp with quartz envelope having a dichroic parabolic reflector focused at 2.6 inches. A heat absorber 35 closely adjacent to lamp 34 is transparent to light and blocks heat from ground glass 36 and entrance iris 37 whose aperture is controlled by brightness control 25'. A collimating lens 38 is adjacent to exit iris 41 having a color filter and whose aperture is controlled by brightness control 24'. A 45° reflecting surface 42 directs the collimated beam through aperture 13 when light source 31 is positioned beneath. Diffusion plate 43 is immediately below clear glass plate 17. Daylight fluorescent tubes 44 above reflectors 45 provide back diffuse illumination in cooperation with diffusion plate 43.

Figure 3:
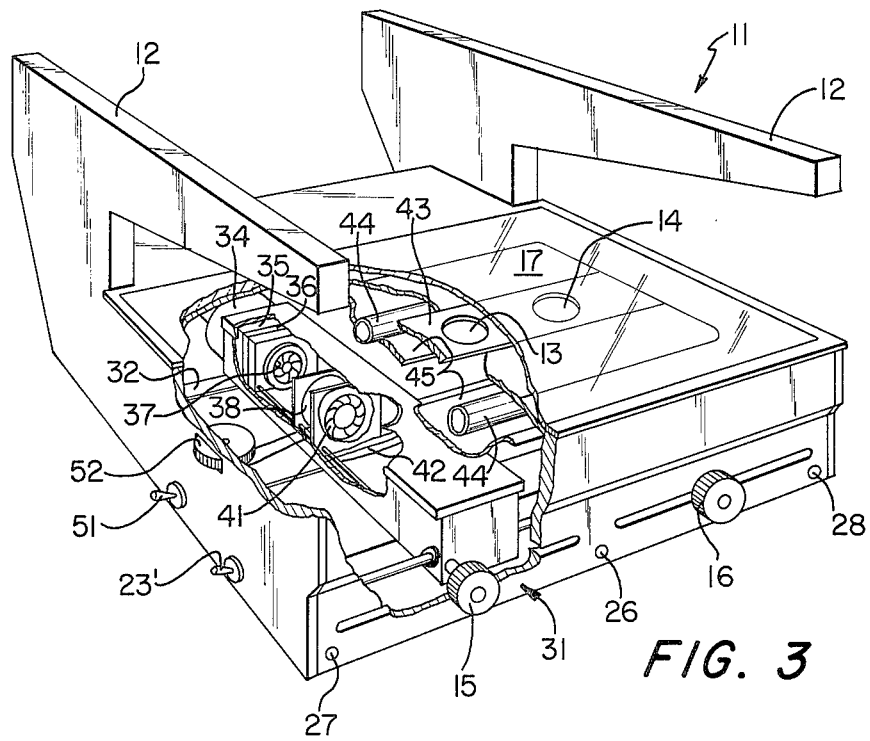
FIG. 3 is a perspective view of the light table with portions cut away to illustrate specific features.

Referring to FIG. 3, there is shown a perspective view of the light table with the microscope and positioning assembly removed and portions cut away to better show features of the invention. FIG. 3 also shows the on-off switch 51 for the fluorescent tubes 44 and the spot source selection for displacing center slat 43 of the diffusion plate so that apertures 13 and 14 are above a respective mirror such as 42 for a specular spot source and displaced from these mirrors for a diffuse source.

Having described the structural arrangement, its mode of operation will be briefly described. Set up the microscope with rhomboids as for standard operation and select a diffuser plate 43 with a spacing between apertures 13 and 14 that corresponds to the separation between the rhomboids. If 15 inch Bausch and Lomb rhomboids are used, special condenser lenses are required to fill the exit pupil of the Bausch and Lomb Zoom 240. Select the condenser lens pair marked for the matched rhomboid objective. Then switch the lamps on using switches 21, 23, 23' and 51. After loosening knobs 15 and 16, position the spot sources to match apertures 13 and 14 and then tighten knobs 15 and 16. Adjust the spot diameter and source brightness with knobs 25 and 25' and 24 and 24' to desired levels. Position rhomboid objectives over the spot sources. The microscope can be scanned across apertures 13 and 14 for viewer operations. Focus and align the film transparencies with diffuse illumination as selected by knob 52. The operator may now manipulate the light table controls to optimize the image information, using the spot brightness and spot diameter controls 24' and 25'.

In operation maximum image enhancement is obtained with the spot brightness control discs 25 and 25' at the low level. Use the diffuser knob 52 interactively while viewing image to compare conventional diffuse with enhanced specular imagery. Use the condenser lenses in the diffuser plate only when necessary. Condenser lenses limit scanning. Stop down the spot diameter with knobs 24 and 24' to maximize image contrast.

The invention has a number of features. Using the input iris for brightness control provides a means for controlling brightness without altering color temperature. Alternatively, brightness may be controlled by adjusting the lamp voltage. A preferred color temperature of 5500° K is obtained by using a blue compensating filter in the exit iris assembly 41. A fan (not shown) is preferably located on the rear panel for cooling the lamp assemblies and for maintaining a positive internal pressure for a dust-free environment by having an air intake that is filtered.

The structural arrangement of the microscope support assembly provides open areas toward the front and sides of the right table to enhance user freedom in handling film chips and adjusting the miroscope rhomboids and focus and facilitate maintaining a tolerance of microscope translation parallel to the table surface of within 0.005" and orthogonality of the surface to the optical axis within 5 minutes of arc. The physical arrangement is compact, provides selective specular or diffuse spot illumination, allows the transparency to be close to the diffusion plate and is relatively easy to operate.

Figure 4:
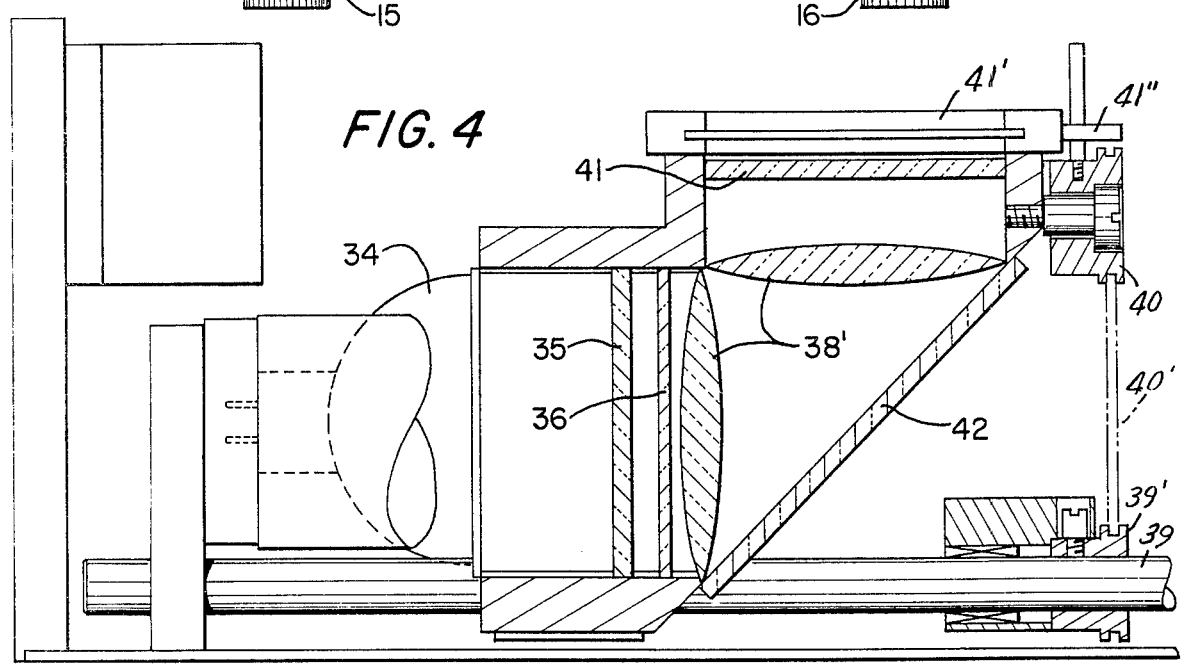
FIG. 4 is a side view partially in section along the axis of an alternate more compact source.

Referring to FIG. 4, there is shown an alternate specular source according to the invention that is more compact than the source of FIGS. 2 and 3 and uses an iris for spot diameter control with intensity control being by means of controlling the voltage to lamp 34. The same reference numerals identify corresponding elements throughout the drawing. Thus, this embodiment includes lamp 34, heat absorber 35 and diffuser 36 as in the embodiment of FIG. 2. Instead of a single lens assembly 38, vertical and horizontal condenser lenses 38' face mirror 42 as shown to illuminate color balancing filter 41 and provide a spot of effective diameter controlled by iris 41' whose arm 41" is controlled by an associate iris drive gear 40 and belt 40' driven by a keyed driver shaft 39 carrying a drive pulley 39'. Knobs, such as 15 and 16, may be used to rotate shaft 39 and adjust the iris.

A specific means for adjusting iris openings are well-known in the art and not a part of the invention. For example, thumb wheels 52 and 24 might be mounted on respective shafts each carrying a drive pulley and an idler pulley, there being a spring-loaded nylon coated stainless steel wire between the drive pulley on one shaft and the idler pulley on the other carrying an eyelet for accommodating a respective iris lever.

It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Viewing apparatus comprising,
    diffusion plate means for providing a diffuse background formed with at least one aperture for transmitting specular illumination,
    a first source of light for illuminating said diffusion plate means,
    a second source of specular light,
    and means for positioning said source of specular light for directing specular light energy through said aperture.

2. Viewing apparatus in accordance with claim 1 and further comprising clear plate means in contact with said diffusion plate means for defining a surface for supporting a transparency to be viewed and for transmitting both diffuse and specular energy therethrough to said transparencies.

3. Viewing apparatus in accordance with claim 1 and further comprising,
    means for relatively displacing said aperture and said source of specular light.

4. Viewing apparatus in accordance with claim 1 wherein said source of specular light comprises,
    a high intensity light source,
    and means defining an input diffuser illuminated by said high intensity light source for controlling the uniformity of said source of specular energy.

5. Viewing apparatus in accordance with claim 4 and further comprising,
    a transparent heat absorbing plate between said high intensity light source and said input diffuser means.

6. Viewing apparatus in accordance with claim 5 and further comprising exit iris means for controlling the effective spot size of said source of specular light,
    and condenser lens means between said entrance diffuser means and said exit iris means for projecting the light energy provided by said high intensity light source.

7. Viewing apparatus in accordance with claim 6 and further comprising,
   filter means associated with said exit iris means for establishing a predetermined color temperature.

8. Viewing apparatus in accordance with claim 1 and further comprising,
   cantilevered arms supported at the side and extending from the rear of said viewing apparatus for supporting a viewing microscope assembly.

9. Viewing apparatus in accordance with claim 8 and further comprising,
   said miroscope viewing assembly,
   said microscope viewing assembly including a microscope and a bridge assembly carrying said microscope mounted upon said cantilevered arms comprising means for supporting said microscope for movement parallel to the surface defined by said clear glass means.

10. Viewing apparatus in accordance with claim 1 wherein said source of specular light comprises,
   a high intensity lamp having its axis generally parallel to said diffusion plate means,
   heat filter means with its axis along the lamp axis adjacent to said lamp for significantly attenuating heat and negligibly attenuating light transmission therethrough,
   a ground glass plate with its axis along the lamp axis adjacent to said heat filter means,
   a first condenser lens with its axis along the lamp axis adjacent to said ground glass plate,
   a second condenser lens with its axis perpendicular to the lamp axis adjacent to said first condenser lens,
   a reflecting surface with its axis displaced 45 degrees from the lamp axis between said first and second condenser lenses for coacting therewith to provide a collimated beam of specular energy through said aperture,
   and controllable iris means with its axis perpendicular to the lens axis between said second condenser lens and said aperture for controlling the effective diameter of said collimated beam.

* * * * *